Figure 1:
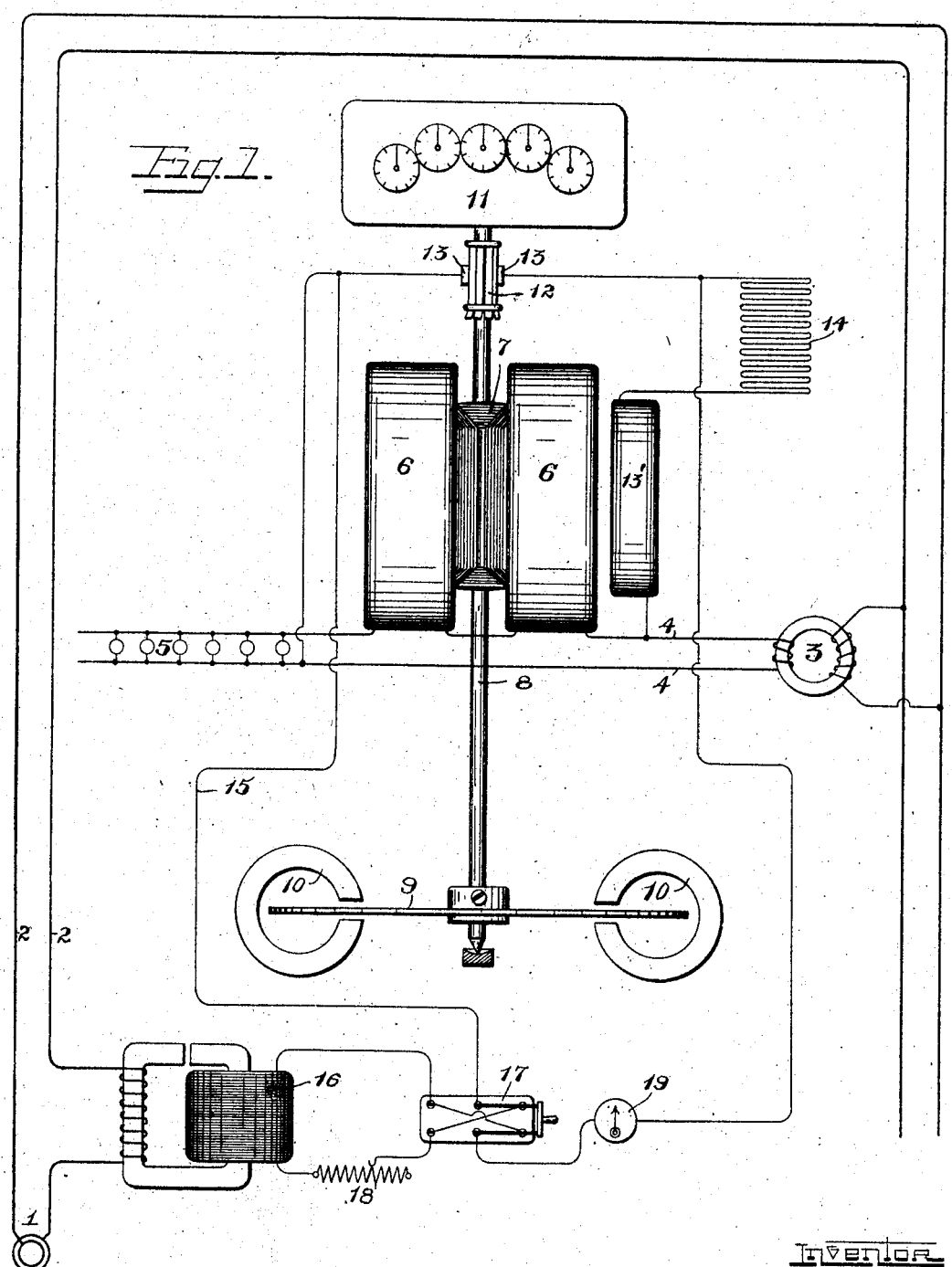

No. 796,066. PATENTED AUG. 1, 1905.
T. DUNCAN.
ELECTRIC METER.
APPLICATION FILED JULY 26, 1902. RENEWED JAN. 7, 1905.

2 SHEETS—SHEET 1.

WITNESSES
Max N. Zabel
Harvey L. Hanson

INVENTOR
Thomas Duncan
BY Charles A. Brown & Cragg
ATTORNEYS

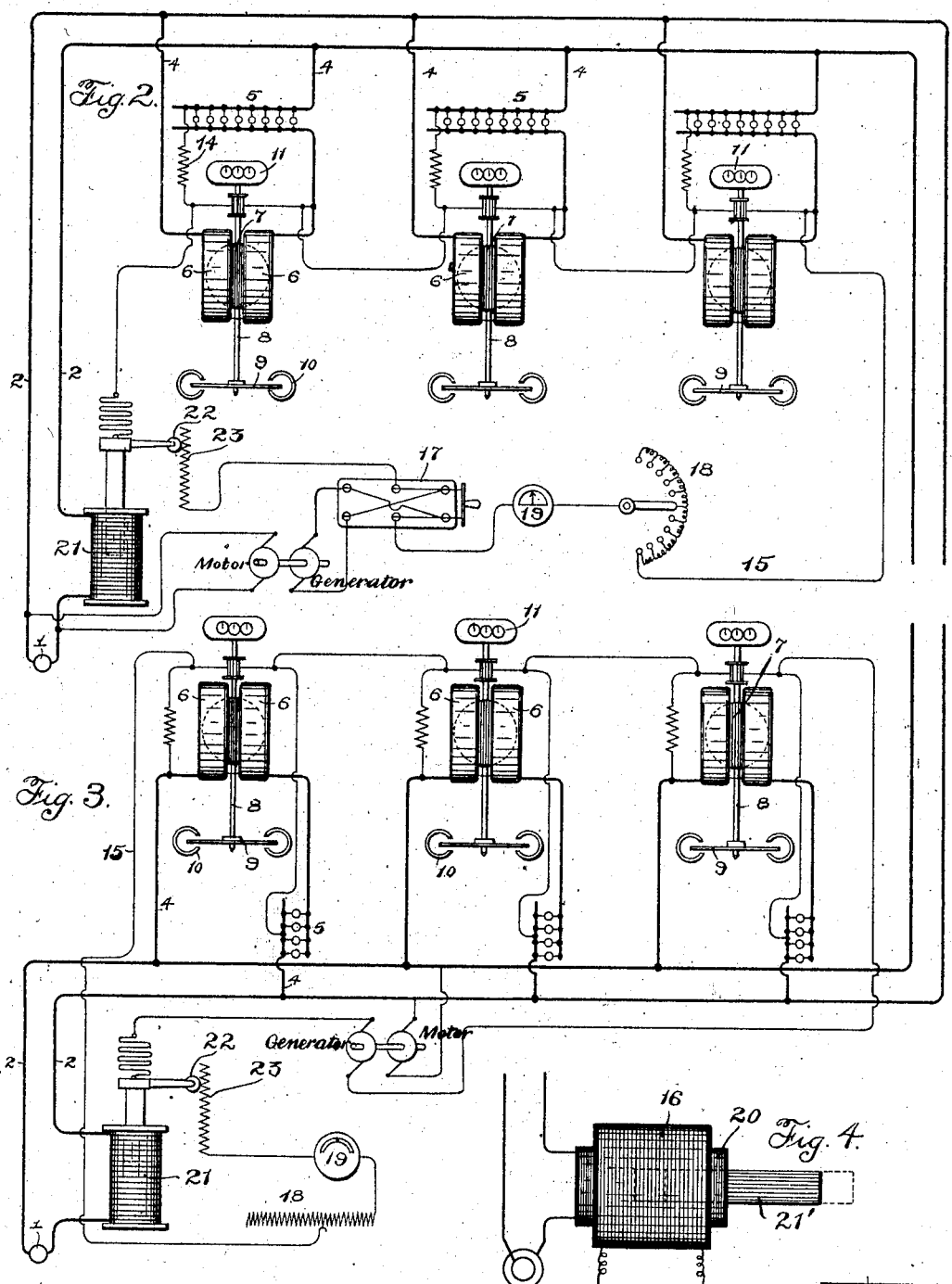

UNITED STATES PATENT OFFICE.

THOMAS DUNCAN, OF LAFAYETTE, INDIANA.

ELECTRIC METER.

No. 796,066. Specification of Letters Patent. Patented Aug. 1, 1905.

Application filed July 26, 1902. Renewed January 7, 1905. Serial No. 239,970.

*To all whom it may concern:*

Be it known that I, THOMAS DUNCAN, a citizen of the United States, residing at Lafayette, in the county of Tippecanoe and State of Indiana, have invented a certain new and useful Improvement in Electric Meters, of which the following is a full, clear, concise, and exact description, reference being had to the accompanying drawings, forming a part of this specification.

My invention relates to multirate meters, and has for its object the provision of improved apparatus whereby meters may be run at a normal rate, over rate, or under rate.

In metering energy or loads in working circuits it is desired to provide for two or three different rates of operation of the counting mechanism of the meters per unit of load or energy, one rate of operation, the normal, continuing, say, from six to six in the daytime, another rate of operation, over rate—that is, above the normal—continuing from six in the evening to twelve midnight, and another rate of operation, the under rate—that is, below the normal—continuing from twelve midnight to six in the morning. The reason for this is that the central station is usually taxed to its utmost between the hours of six and twelve at night, for which, consequently, the consumer who uses power during this time should be charged at a rate in proportion to the cost of the central-station installation, which is equipped for this maximum output, required at no other time. Between twelve and six in the morning the station is taxed the least, during which time a minimum amount of apparatus is required, calling for the minimum return upon the investment. Between the hours of six to six in the day-time the central station is not taxed to its limit; nor is it taxed at the minimum, so that the consumer should be charged a rate warranted by the installation necessary to supply the normal demand. Obviously these periods during which the normal, maximum, and minimum rates of operation of the measuring mechanisms per unit of energy or load are required may vary with the season and local conditions.

In practicing my invention I employ a secondary-pressure circuit, upon which secondary pressure may be impressed in any suitable way from a suitable source, preferably through the intervention of a motor-generator, generator, or battery. This supplemental-pressure circuit may serve either to increase the current in the armature or pressure winding of the meter when the meter is to be operated at an over rate, or this secondary pressure may serve to supply a counter-current in the armature or pressure winding of the meter when the meter is to run at an under rate, the means for controlling the application of the supplemental current to the pressure-field or armature of the meter also serving to open the supplemental-pressure circuit to permit the meter to run at a normal rate.

In my copending application, Serial No. 67,819, filed July 11, 1901, I have set forth a system wherein booster-pressure generators are especially provided for creating a supplemental pressure, pressure of the supplemental-pressure generator being automatically controlled by a solenoid included in the main circuit, the operation of the solenoid varying according to the volume of current in the distribution-circuit. In the apparatus of my said copending application a plurality of pressure-conductors were led through the district of distribution parallel with the main conductors. There was provided in connection with each meter a circuit-changing appliance that served to cause the pressure-winding of the meter to be subject alone to the impressed pressure of the system or to be subject to an additive electromotive force to cause the meter to run above the normal rate or a counter electromotive force to cause the meter to run at an under rate. By means of my present invention I am enabled to reduce the number of supplemental pressure-conductors that are carried through the district of consumption. I am also enabled to dispense with the special circuit-changing appliances employed and located at the same places with the meters. In my present invention the armature or pressure winding of the meters is included in two circuits, which may be simultaneously closed—one, the shunt from the main source of supply, which traverses the entire armature or pressure winding circuit, and the other, the one called the "secondary," which traverses the armature or pressure winding only. The secondary pressure may be obtained from the secondary of a transformer when applied to alternating-current systems of electrical distribution, the primary of the transformer being preferably included in series in a transmission-main, or the secondary pressure may be obtained from a small motor-generator or from another dynamo in case a D. C. system is employed. If it is desired to have the meters operate at two rates, the normal rate of operation may be secured by opening the secondary-pressure circuit at the generating-station, whereby only the shunt-current from the mains traverses the armature or pressure winding, or this pressure-circuit may be closed at the same place, whereby the armature or pressure winding is subjected to the secondary current and in multiple to the main shunt-current to modify the rate of the meter. If it is desired to have the meter operate at three rates, a pole-changing switch may be employed, which causes the secondary pressure to produce an additive current to the armature or pressure winding to increase the torque, and thereby operate the meter at an over rate, or the switch is manipulated to cause the secondary pressure to produce a counter-current through the armature or pressure winding, whereby the torque is diminished and the meter run at an under rate. Thus I dispense with the circuit-changing devices associated with each meter by employing a common circuit in which a generating-station switching device is employed for simultaneously controlling the association of all the pressure-windings of the meters with the secondary-pressure circuit. The secondary-pressure circuit is preferably in the form of a round circuit and may be totally distinct from the transmission-mains.

In addition to controlling the application and direction of the supplemental armature or pressure winding circuit the degree thereof may be automatically regulated according to the load. A solenoid may be employed for cutting resistance out of and into the secondary circuit to increase and decrease this auxiliary circuit through the armature or pressure winding as the current through the system increases and decreases, or this result is accomplished in the transformer, whose induction is automatically varied according to the load.

I will explain my invention more fully by reference to the accompanying drawings, in which—

Figure 1 is a diagrammatic view of an alternating-current system of distribution, a meter being associated therewith in accordance with my invention. Fig. 2 illustrates another system of electrical distribution, wherein the meters are included in a common round circuit supplied with current from a generating end of a motor-generator. Fig. 3 is a view of another system of electrical distribution wherein the meters are adapted for operation at two rates of speed, the supplemental current-circuit being also supplied from a separate source of supply. Fig. 4 is a view illustrating the means that may be employed in alternating-current systems of distribution for controlling the pressure in the secondary-pressure circuit.

Like characters of reference indicate like parts in the several figures.

In the various figures I have illustrated commutated motor-meters; but it is obvious that other forms of meters may be employed in connection with the invention.

Referring first more particularly to Fig. 1, I have therein shown a system of alternating-current distribution employing an alternating-current generator 1, supplying current to transmission-mains 2 2, leading current to the district of consumption, where I have indicated a transformer 3, whose primary is in bridge of the mains and whose secondary conveys current over the distributing-mains 4 4 to the translating devices 5. A field-winding subdivided into coils 6 6 is included in one of the mains 4. The pressure-winding in this instance is in the form of an armature 7, mounted upon a rotating spindle 8, at the lower end of which is provided a damping-disk 9, arranged within the fields of the damping-magnets 10 10. The spindle 8 operates a suitable counting mechanism 11. The armature is provided with a commutator 12, upon which rest commutator-brushes 13 13, that include the pressure-winding 7 in bridge of the mains 4 4. This bridge-conductor also includes a starting-coil 13' and a choking resistance 14. By means of the armature subjected to the pressure across the mains 4 4 and the current-field a normal torque is produced that serves to operate the meter at a normal rate in accordance with the load upon the system.

To secure a modified torque a round circuit 15 is provided that includes the armatures of a plurality of meters, only one being shown in Fig. 1. This round circuit is subject to a modifying secondary electromotive force when it is desired to depart from the normal rate.

When alternating-current systems of electrical distribution are involved, I prefer to employ the means illustrated in Fig. 1, where the secondary pressure is generated in the secondary coil 16 of a transformer whose primary is connected in series with one of the mains 2. The core of the transformer is provided with adjusting reluctance, preferably in the form of a complete air-gap.

The system shown in Fig. 1 is organized to produce three rates of rotation of the meter per unit of load or energy, for which purpose a switch 17 is associated with the secondary-pressure circuit, which switch when thrown to the right, for example, will cause an auxiliary current to be added to the normal current through the armature or when thrown to the left will cause the auxiliary current to act as a counter-current to the normal current through the armature from the mains 4 4. When the switch 17 is in a neutral position, the secondary circuit is open, when the meter will operate at a normal rate. The switch 17 thus constitutes a pole-changing switch. An adjusting device, preferably in the form of a resistance 18, is included in the supplemental secondary-pressure circuit and adjusts the resistance thereof to compensate for the number of meters in the said secondary circuit. A certain percentage of overload may be also provided for by the adjustable resistance 18, a current-indicator 19 serving as a test. Another form of adjustment is illustrated in Fig. 4, where the transformer having secondary and primary windings 16 and 20 is provided with an adjustable core 21', whereby the secondary pressure may be adjusted. The amount of pressure in the secondary circuit 15 is automatically varied by reason of the varying induction between the primary and secondary of the transformer occurring upon variation of load. If the full load (peak load) is, say, one thousand amperes, the turns of the primary 20 may be made to give the desired per cent. of increase in rate at full load, so that as the load gradually increases—say from six o'clock up to the highest peak load—the rate is automatically increasing with the load, as is required in an ideal multirate metering system. As the load gradually decreases, so does the rate.

The arrangement illustrated in Figs. 2 and 3 are applicable to direct-current systems, and parts similar to those illustrated in Fig. 1 are given similar characters of reference. The systems illustrated in Figs. 2 and 3 are similar in general characteristics to that illustrated in Fig. 1, and I shall therefore not describe them in detail, but merely point out the distinctions between these systems and that of Fig. 1.

In each of Figs. 2 and 3 is illustrated a solenoid 21, whose helix is in series in a transmission-main, the core of the solenoid carrying a rolling contact 22, that constitutes one terminal of the secondary-pressure circuit, the other end of the pressure-circuit terminating in a resistance 23, which is excluded from circuit upon an increase in the load upon the system to thereby increase the secondary pressure and which is included in circuit when the load is decreased, thereby reducing the secondary electromotive force. The pole-changing switch (illustrated in Fig. 2) is designed for controlling the direction of application of the secondary pressure to cause the same to supply an additive current to the armature when the rate of operation is to be increased and as a parallel counter-current when the rate of operation is to be diminished. The armatures only are preferably included in series relation in the round circuit to secure more effective control thereof. There are also illustrated in Figs. 2 and 3 indicators 19, by which the starting per cent. may be adjusted in the event of meters being added to or taken from the circuit during the day. If the starting per cent. is indicated by the pointer standing at the center of the scale, the insertion of more meters will cause it to indicate less current, and the exclusion of meters will cause it to indicate more current. By adjusting the resistance 18 or the core 21' this rearrangement of meters may be compensated for. The armature-windings of the meters are so connected with the secondary-pressure circuit that they alone are subject to the secondary pressure, the resistance and starting coils of each meter being excluded from the secondary-pressure circuit, giving thereby the most efficient arrangement.

While I have herein shown and particularly described the preferred embodiment of my invention, it is obvious that changes may be made without departing from the spirit thereof, and I do not, therefore, wish to be limited to the precise disclosures herein set forth; but,

Having thus described my invention, I claim as new and desire to secure by Letters Patent—

1. In a system of electrical distribution, the combination with a current-generator, of a meter located at a district of consumption, and a secondary pressure-circuit for subjecting the meter-armature to an additional adjusting-current simultaneously with the main pressure, substantially as described.

2. In a system of electrical distribution, the combination with a current-generator, of a meter located at a district of consumption, a secondary pressure-circuit for subjecting the meter-armature to a second current, and an automatically-governed electromagnetic device for varying the adjusting secondary current according to the load in the system to produce a varying rate, substantially as described.

3. In a system of electrical distribution, the combination with a current-generator, of a meter located at a district of consumption, a secondary pressure-circuit for subjecting the meter-armature to a second current, and an automatically-governed electromagnetic device for varying the adjusting second current through the armature according to the load in the system, the said electromagnetic device having a helix included in series in the working circuit, substantially as described.

4. In a system of electrical distribution, the combination with an alternating-current generator, of a meter at a district of consumption, a secondary pressure-circuit for subjecting the meter-armature to a second current, and a transformer having its primary included in the main working circuit and its secondary in the secondary pressure-circuit, substantially as described.

5. In a system of electrical distribution the combination with an alternating-current generator, of a meter at a district of consumption, a secondary pressure-circuit for subjecting the meter-armature to a second current, a transformer having its primary included in the main working circuit and its secondary in the secondary pressure-circuit, and an adjusting means for varying the secondary current in accordance with the number of meters in the secondary circuit, substantially as described.

6. In a system of electrical distribution, the combination with a current-generator, of a meter located at a district of consumption, a secondary pressure-circuit for subjecting the meter-armature to a second current and an adjusting means for varying the secondary current in accordance with the number of meters in the secondary circuit, substantially as described.

7. In a system of electrical distribution, the combination with a current-generator, of a meter located at a district of consumption, a secondary pressure-circuit including the meter-armature and a switching device for opening and closing the secondary pressure-circuit and serving to include the armature therein when said armature is included in the main pressure-circuit, substantially as described.

8. In a system of electrical distribution, the combination with a current-generator, of a meter located at a district of consumption, a secondary pressure-circuit including the meter-armature, and a pole-changing switch for opening and closing the secondary pressure-circuit and causing the secondary current to pass through said pressure-circuit in one direction or the other, substantially as described.

9. In a system of electrical distribution, the combination with a current-generator, of meters located at a district of consumption, a secondary pressure-circuit including the meter-armatures, and switching mechanism at the generating-station for opening and closing the secondary circuit and serving to include the armature therein when said armature is included in the main pressure-circuit, substantially as described.

10. In a system of electrical distribution, the combination with a current-generator, of meters located at a district of consumption, a secondary pressure-circuit including the meter-armatures, and a pole-changing switch for opening and closing the secondary circuit and causing the current to be passed therethrough in one direction or the other, substantially as described.

11. In a system of electrical distribution, the combination with a current-generator, of meters located at a district of consumption, a secondary pressure-circuit including the meter-armatures in series and switching mechanism at the generating-station for opening and closing the secondary circuit, substantially as described.

12. In a system of electrical distribution, the combination with a current-generator, of meters located at a district of consumption, a secondary pressure-circuit including the meter-armatures in series, and a pole-changing switch for opening and closing the secondary circuit and causing the current to be passed therethrough in one direction or the other, substantially as described.

13. In a system of electrical distribution, the combination with an alternating-current generator, of a meter at a district of consumption, a secondary pressure-circuit for subjecting the meter-armature to a second current and receiving the second current from the main working circuit, a transformer having its primary included in the main working circuit and its secondary in the secondary pressure-circuit, and a core for the transformer having adjusting reluctance, substantially as described.

14. In a system of electrical distribution, the combination with a current-generator, of a meter located at a district of consumption, and a secondary pressure-circuit for subjecting the pressure-winding to an additional adjusting-current, substantially as described.

15. In a system of electrical distribution, the combination with a current-generator, of a meter located at a district of consumption, a secondary pressure-circuit for subjecting the pressure-winding to a second current, and an automatically-governed electromagnetic device for varying the adjusting secondary current according to the load in the system to produce a varying rate, substantially as described.

16. In a system of electrical distribution, the combination with a current-generator, of a meter located at a district of consumption, a secondary pressure-circuit for subjecting the pressure-winding to a second current and an automatically-governed electromagnetic device for varying the adjusting second current through the armature according to the load in the system, the said electromagnetic device having a helix included in series in the working circuit, substantially as described.

17. In a system of electrical distribution, the combination with an alternating-current generator, of a meter at a district of consumption, a secondary pressure-circuit for subjecting the pressure-winding to a second current, and a transformer having its primary included in the main working circuit and its secondary in the secondary pressure-circuit, substantially as described.

18. In a system of electrical distribution the combination with an alternating-current generator, of a meter at a district of consumption, a secondary pressure-circuit for subjecting the pressure-winding to a second current, a transformer having its primary included in the main working circuit and its secondary in the secondary pressure-circuit, and an adjusting means for varying the secondary current in accordance with the number of meters in the secondary circuit, substantially as described.

19. In a system of electrical distribution, the combination with a current-generator, of a meter located at a district of consumption, a secondary pressure-circuit for subjecting the pressure winding to a second current and an adjusting means for varying the secondary current in accordance with the number of meters in the secondary circuit, substantially as described.

20. In a system of electrical distribution, the combination with a current-generator, of a meter located at a district of consumption, a secondary pressure-circuit including the pressure-winding and a switching device for opening and closing the secondary pressure-circuit and serving to include the armature therein when said armature is included in the main pressure-circuit, substantially as described.

21. In a system of electrical distribution, the combination with a current-generator, of a meter located at a district of consumption, a secondary pressure-circuit including the pressure-winding, and a pole-changing switch for opening and closing the secondary pressure-circuit and causing the secondary current to pass through said pressure-circuit in one direction or the other, substantially as described.

22. In a system of electrical distribution, the combination with a current-generator, of meters located at a district of consumption, a secondary pressure-circuit including the pressure-windings, the switching mechanism at the generating-station for opening and closing the secondary circuit and serving to include the armature therein when said armature is included in the main pressure-circuit, substantially as described.

23. In a system of electrical distribution, the combination with a current-generator, of meters located at a district of consumption, a secondary pressure-circuit including the pressure-windings, and a pole-changing switch for opening and closing the secondary circuit and causing the current to be passed therethrough in one direction or the other, substantially as described.

24. In a system of electrical distribution, the combination with a current-generator, of meters located at a district of consumption, a secondary pressure-circuit including the pressure-windings in series and switching mechanism at the generating-station for opening and closing the secondary circuit, substantially as described.

25. In a system of electrical distribution, the combination with a current-generator, of meters located at a district of consumption, a secondary pressure-circuit including the pressure-windings in series, and a pole-changing switch for opening and closing the secondary circuit and causing the current to be passed therethrough in one direction or the other, substantially as described.

26. In a system of electrical distribution, the combination with an alternating-current generator, of a meter at a district of consumption, a secondary pressure-circuit for subjecting the pressure-winding to a second current and receiving the second current from the main working circuit, a transformer having its primary included in the main working circuit and its secondary in the secondary pressure-circuit, and a core for the transformer having adjusting reluctance, substantially as described.

In witness whereof I hereunto subscribe my name this 3d day of June, A. D. 1901.

THOMAS DUNCAN.

Witnesses:
   JOHN STAHR,
   HARVEY L. HANSON.